(12) United States Patent
Svedlind et al.

(10) Patent No.: US 6,176,890 B1
(45) Date of Patent: Jan. 23, 2001

(54) FILTER

(75) Inventors: Thomas Svedlind, Trosa; Erik Lans, Västerljung, both of (SE)

(73) Assignee: Camfil AB (SE)

( * ) Notice: Under 35 U.S.C. 154(b), the term of this patent shall be extended for 0 days.

(21) Appl. No.: 09/277,349

(22) Filed: Mar. 26, 1999

(30) Foreign Application Priority Data

Mar. 25, 1998 (SE) .................................................. 9800993

(51) Int. Cl.⁷ .................................................. B01D 29/07
(52) U.S. Cl. .......................... 55/524; 55/385.1; 55/500; 55/521; 55/529; 210/493.5; 210/508
(58) Field of Search ..................... 55/385.1, 483, 55/497, 500, 521, 529, DIG. 5, 524; 210/493.5, 508

(56) References Cited

U.S. PATENT DOCUMENTS

| | | | |
|---|---|---|---|
| 4,135,900 | * 1/1979 | Westlin et al. ........................... | 55/497 |
| 4,227,953 | * 10/1980 | Wasielewski et al. ................. | 55/500 |
| 4,615,804 | * 10/1986 | Wright ................................... | 55/521 |
| 4,728,426 | * 3/1988 | Rüdinger ............................... | 55/500 |
| 5,071,555 | 12/1991 | Enbom . | |
| 5,236,480 | 8/1993 | Svensson et al . | |
| 5,744,036 | * 4/1998 | Ude ....................................... | 55/524 |
| 5,888,262 | * 3/1999 | Kahler ............................... | 55/DIG. 5 |
| 6,036,752 | * 3/2000 | Revier ................................... | 55/524 |

FOREIGN PATENT DOCUMENTS

| | | |
|---|---|---|
| 0377419 | 7/1990 | (EP) . |
| 3219671 | 7/1990 | (DE) . |
| 2490970 | 10/1980 | (FR) . |
| 1272564 | 5/1972 | (GB) . |

* cited by examiner

*Primary Examiner*—David J. Lans
*Assistant Examiner*—Minh-Chau T. Pham
(74) *Attorney, Agent, or Firm*—Hayes, Soloway, Hennessey, Grossman & Hage, P.C.

(57) ABSTRACT

Filter for air and intended for use in wet environment of folded filter material (1) that is held together by glue strips (2,3) on the front and rear side of the filter material. The glue strings on the front side of the filter are interrupted at the bottom of the folds turned forwards so that transport channels (4) for water (5) are obtained at each forwards turned fold. Furthermore the filter folds are oriented vertically to facilitate for the water to run off.

16 Claims, 1 Drawing Sheet

FILTER

BACKGROUND OF THE INVENTION

Filters with a high degree of separation encounter problems with pressure drop over the filter when used in a damp environment. In order to achieve the high degree of separation, the filters typically have very small passage openings. These openings also stop very small water drops. The openings get clogged by the water due to the surface tension and adhesion of the water to the filter material. Water in the form of fog, rain or condensation will in this way block many of the flow passages through the filter, at which the reduced available flow area increases the filter pressure drop. The increased filter pressure drop increases power losses in the filter. The removal of the water is preferable in many cases over having to increase the filter area as compensation at installations particularly since larger filters mean a big increase in cost. Even if one chooses not to increase the filter area, an energy loss is obtained as a result of the increased pressure drop. This energy loss can be considerable.

The present invention has as its object to remedy the above problem and provide a filter that is not influenced or at least only to a small amount by the pressure drop caused by moisture in the air that is to be filtered. Examples of filters where these phenomena may arise are the inlet filter to gas turbines used for power supply at oil platforms, as well as of course other filters that are used on oil platforms, boats etc.

BRIEF SUMMARY OF THE INVENTION

In accordance with the present invention, this object is solved starting with a filter constituted of a folded filter material held together by glue strings on both sides of the filter material. On one side of the filter material, the one that is to constitute the inlet side, the glue strings are discontinuously positioned corresponding to the inner end of the fold. The bottoms of the filter folds are free of glue. In this way the water can flow along the bottom of the filter folds uninterrupted by glue. By arranging the filter with the filter folds vertically, the water under the influence of the gravity can flow downwards in the bottom of the folds. The sides of the folds are inclined relative to the flow direction of the entering air, which ensures that the water on the inner sides of the filter folds is driven away towards the bottom where continued transport out of the filter occurs. The water thus no longer remain over a large part of the area of the filter but is collected in an efficiently draining channel that only covers a small part of the area of the filter, that therefor is not blocked to any appreciable degree by the water, but allows a free passage of air. This presents a low pressure drop and small energy losses.

In the filter arrangement according to the present invention, one would expect that the glue strings on the outlet side of the filter, at the contraction of the filter material to its intended final form, would compress the filter folds that are turned towards the inlet side, completely in the inner end (bottom), since no resistance exist in the shape of a glue string, with impaired air flow as a result. In practice, it has however been discovered that this does not occur and that the filter still functions well during normal conditions and that it also functions well in moist or wet conditions. Likewise, one would expect that the absence of glue as resistance on the inner side would give a more narrow fold that would in turn result in a very deep required "water channel" that would prevent air transport through a large part of the filter area, however this does not occur either. Even when viewing the filter, it is hard to understand that the water transport can be so good as it in practice has turned out to be.

Further, one would expect poor strength due to the reduced amount of glue. These filters already have a tendency to be broken at continuous glue strings when applied on both sides the way they are normally arranged with the folds in the shortest dimension. It has however turned out that the filters according to the present invention become stronger and even have a sufficient structural strength to be placed with the folds in the longest dimension. The reasons for this being possible are presumably several. The efficient draining of the water results in a reduced pressure drop and thereby a reduced strain. By arranging the folds in the length direction of the filter elements the filter folds will at the same time become vertical at the most usual installations of this kind and the water transport is thereby further enhanced by the gravity.

The glue string on the rear side of the filter when a pressure strain is applied on the filter (which normally is what breaks the filter) is subjected to an extension strain that can be taken by the glue string on the back side that has been glued together. A possible inner glue string in the bottom of the fold probably does not contribute at all to the tensional strength since the filter material, that in this case, has to transfer the tension strains, has difficulty doing this since the tensional strain goes straight through the filter material. With such a strain, one risk in reality is that a glue string on the inner side of the filter does not constitute a reinforcement but instead produces a weakening that in the end results in the filter bursting. Depending, on for instance varying moistening and flow volume, the pressure drop and the strain on the filter will vary with a membrane like movement for the filter as a result. If a glue string exists on the inside of the fold, this results in alternating tensile strains on the filter material perpendicular to the surface of the filter material. With time this movement loosens the filter material that has its strength as well as filtering properties reduced and in the end breaks. The filter according to the present invention is thus not as expected weakened but instead strengthened at the same time as the drainage of water is ensured.

A possible tensile strain on the back side of the filter also opens the water channel constituted by the bottom of the fold with resulting improved flow and reduction of pressure drop and strain, presumably however this effect is very marginal.

On the front side of the filter, due to the influence of a pressure over the area of the filter, a compressing force results and glue in the folds can contribute to the strength. The glue in these folds does not have any adverse effect on the water transport.

In a preferred embodiment of the present invention, the filter frame at the lower end of the filter folds is provided with openings or passages or inclined in order to help drainage. Water collects but successively flows off from the filter when it flows down along the bottoms of the filter folds. In the extreme case, one could even consider that the folded material at the lower end of the filter on the exit side of the filter is airtight glued or held only precisely behind a glue string on the rear side of the filter in such a way that the water without any hindrance can flow off downwards from the filter folds (the filter folds on the back side being sealed at their lowest ends by a continuous glue string). For reasons of strength the filter material may even be glued to the filter frame on the front side. Alternatively the frame may be provided with a slot along the bottoms of the filter folds for letting the water out. This version may also be used if the filter material is not hydrophobic but instead is moistened by the water, since the water in this case may flow or be transported inside the filter material itself down to the lower edge there to drop freely from the filter.

Within the frame of the inventive thought, one can also contemplate a nonsymmetric shape of the folds where the folds that are turned against the entering possibly wet air for the making of transport channels for water with greater cross section area are smother bent, resulting in a smaller part of the sides of the folds coming in contact with the water. Since the adhesion surface of the water at the filter also is reduced in this way the transport is also faster.

Possibly the filter material need not to be folded at the bottoms of the channels, but may instead be bent to the right shape. This can for instance be done by the tools for achieving the folds being differently shaped, for instance giving rounded half circle shape for the water channel bottoms.

Alternatively the filter material at the bottom of the folds where water transport is to take place can be made wider during the hardening of the glue on the rear side of the filter material by holding this apart, either by the glue strings at the folds upper and forwards turned edges or by the preembossing of a smother fold corresponding to the bottom fold, that counteracts the glue pressure (from the other side). Also the application of a moderate amount of glue on the rear side of the filter may function to this end so that the glue receives a small tendency to compress the fold at the bottom. Alternatively the glue on the rear side of the filter may have a higher temperature than the glue on the front side and thus less viscosity and pressure effect at the forming. Of course these measures can be combined.

Further advantages and characteristics of the invention are apparent from an embodiment described below with reference to the enclosed drawing.

DETAILED DESCRIPTION OF THE INVENTION

Figure 1:
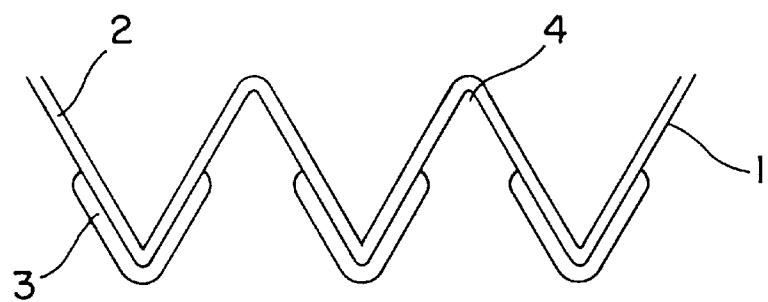
FIG. 1 shows the filter during the folding.
Figure 2:
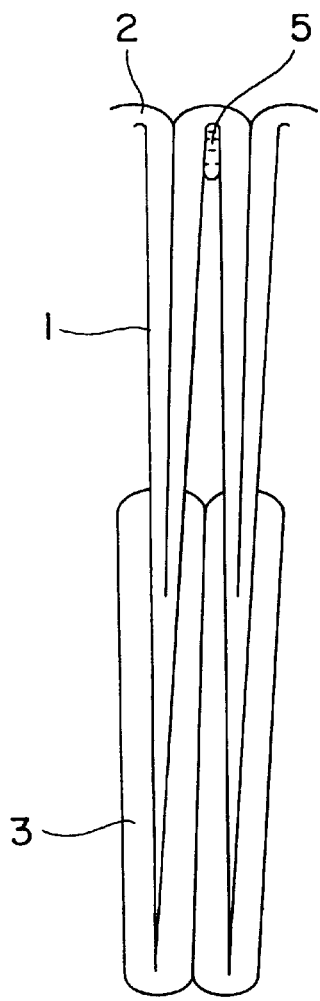
FIG. 2 shows an enlarged cross section of the filter at a glue string.

The filter material 1 shown in the drawing has a front side and a back side. On the back side a glue string 2 runs over the entire back side of the filter material 1 and a discontinuous glue string 3 is applied to the front side of the filter material 1. The glue strings 2 and 3 in melt condition are positioned on the extended filter material after the material is folded. When the folds are compressed to the position shown in FIG. 2, the still warm glue string sections that come in contact with each other will be glued to each other. On the front side of the filter material 1 the glue string 3 has interruptions corresponding to the inner sections of the folds so that possible flow channels 4 for the water 5 are obtained. The glue extends on the front of the filter down to half the depth of the folds. The filter material 1 may advantageously be hydrophobic so that the water as droplets can run off the filter material down in the folds where it is collected to rivulets on the bottoms of the folds turned forwards and flow down to the lower end of the filter there to run off from the filter.

What is claimed is:

1. An air filter of folded filter material that is held together by glue strings on a first surface and a second surface of the filter material, wherein the glue strings on the first surface of the filter material are discontinuously positioned on the first surface of the filter material such that when the filter material is folded into a zigzag configuration a water transport channel uninterrupted by glue is formed between the zigzag configuration and the glue string on the first surface of the filter material.

2. Filter according to claim 1, wherein the glue strings on the front and rear surfaces have at least some overlap.

3. Filter according to claim 1, wherein a filter frame is arranged with openings along a periphery of the filter so that water flowing in the transport channel can run out from the filter.

4. Filter according to claim 1, wherein the glue strings on the rear surface of the filter material are continuous.

5. Filter according to claim 1, wherein the glue strings discontinuously positioned on the front surface of the filter material measure corresponding to $1/10$–$9/10$ of a depth of the filter.

6. Filter according to claim 1, wherein the filter material is mounted so that the water transport channels are oriented vertically in relation to a horizontal plane so that water can flow down and out from the filter.

7. Method for the fabrication of a filter in accordance with claim 1, wherein the filter material after an initial prefolding is extended and provided with glue strings, which are positioned on the front surface of the filter material in a discontinuous pattern corresponding to the water transport channels.

8. Method according to claim 7, wherein the filter material adjacent the transport channel during the hardening of the glue on the rear surface of the filter material is held apart so that water transport channels are achieved by the glue strings along the front surface and the rear surface.

9. Method according to claim 7, wherein the filter material adjacent the transport channel is formed so that a rounded more or less half circle shaped fold is obtained.

10. Method according to claim 7, wherein the filter material adjacent the transport channel during the hardening of the glue on the rear surface of the filter material is held apart so that water transport channels are achieved by preembossing of a smother fold that counteracts the glue pressure.

11. Method according to claim 7, wherein the filter material adjacent the transport channel during the hardening of the glue on the rear surface of the filter material is held apart so that water transport channels are achieved by the applying of glue on the rear surface of the filter material so that the glue has a tendency to compress the fold adjacent the transport channel.

12. Method according to claim 7, wherein the filter material adjacent the transport channel during the hardening of the glue on the rear surface of the filter material is held apart so that water transport channels are achieved by applying glue on the rear surface of the filter material that has a higher temperature than the glue on the front surface of the filter material.

13. A filter comprised of sheet material having first and second opposing surfaces, the sheet material being folded in a zigzag configuration such that the first and second surfaces of the sheet material form a first set and a second set of spaced-apart channels, each of said channels having an open wide end and a closed narrow end formed by mutually convergent channel faces such that a width of each channel becomes progressively smaller toward the narrow end, the first set of channels having their channel faces convergent in a first direction, and the second set of channels having their channel faces convergent in a second direction opposite the first direction, a first spacer comprising a hardenable material continuously dispensed in a flowable state onto at least the first surface of the sheet material so as to lie within the first set of channels when the sheet material is in a folded state, and a second spacer disposed on the second set of channels for maintaining the convergent relationship of the channel faces, the second spacer comprising a hardenable material discontinuously dispensed in a flowable state onto at least the second surface of the sheet material adjacent the wide end of the second set of channels and spaced from the narrow end so as to lie within the second set of channels when the sheet material is in a folded state and form a transport channel adjacent the narrow end.

14. The filter of claim 13, wherein the hardenable material is glue.

15. An air filter of folded filter material that is held together by glue strings on a first surface and a second surface of the filter material, wherein the glue strings on the first surface of the filter material are discontinuously positioned along the first surface of the filter material and the glue strings on the second surface of the filter material are continuously positioned along the second surface of the filter material in a uniform thickness such that when the filter material is folded into a zigzag configuration a water transport channel is formed between the zigzag configuration and the glue string on the first surface of the filter material.

16. An air filter, comprising:

a filter material having a first surface and a second surface, the filter material folded in a zigzag configuration such that the first and second surfaces of the sheet material form a first set and a second set of spaced-apart channels, each channels having an open wide end and a closed narrow end formed by mutually convergent channel faces such that a width of each channel becomes progressively smaller toward the narrow end, the first set of channels having their channel faces convergent in a first direction, and the second set of channels having their channel faces convergent in a second direction opposite the first direction, the first set of channels further having a first portion adjacent the open wide end and a second portion adjacent the narrow end, the first portion having a glue string secured thereto for maintaining the convergent relationship of the channel faces, and the second portion free of glue for forming a water transport channel, the first portion and the second portion being adjacent.

* * * * *